(12) United States Patent
Galle

(10) Patent No.: US 8,123,179 B2
(45) Date of Patent: Feb. 28, 2012

(54) CAPILLARY MOUNTING CLIP

(75) Inventor: Keith L. Galle, Mount Prospect, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/795,654

(22) Filed: Jun. 7, 2010

(65) Prior Publication Data

US 2011/0297798 A1   Dec. 8, 2011

(51) Int. Cl.
*F16L 3/08* (2006.01)
(52) U.S. Cl. .......................................................... 248/65
(58) Field of Classification Search .................... 248/49, 248/65, 74.1, 75
See application file for complete search history.

(56) References Cited

U.S. PATENT DOCUMENTS

| | | | |
|---|---|---|---|
| 4,163,372 A | 8/1979 | Frye | |
| 5,660,133 A * | 8/1997 | Munich | 114/219 |
| 6,134,370 A * | 10/2000 | Childers et al. | 385/135 |
| 6,554,489 B2 * | 4/2003 | Kent et al. | 385/86 |
| 2003/0222183 A1 * | 12/2003 | Kato | 248/49 |
| 2007/0034750 A1 * | 2/2007 | Pierce et al. | 248/49 |
| 2008/0116324 A1 * | 5/2008 | Holder | 248/65 |

OTHER PUBLICATIONS

"Averaging Thermistor Sensor ST-FZ Sieries", kele Catalog, 2006, www.kele.com, USA.
Klipet CC1 Series, http://www.klipet.com/CC1.php, 2005-2010.

* cited by examiner

*Primary Examiner* — Ramon Ramirez

(57) ABSTRACT

A capillary mounting clip is disclosed. The capillary mounting clip includes a first planar surface, a second planar surface aligned parallel to the first planar surface, a curvilinear capillary mounting surface carried between the first planar surface and the second planar surface wherein the curvilinear capillary clip mounting surface is sized to smoothly accept a substantially cylindrical outer surface of a capillary tube; and a capillary slot defined within the second planar surface wherein the capillary slot is aligned substantially perpendicular to the first planar surface.

15 Claims, 4 Drawing Sheets

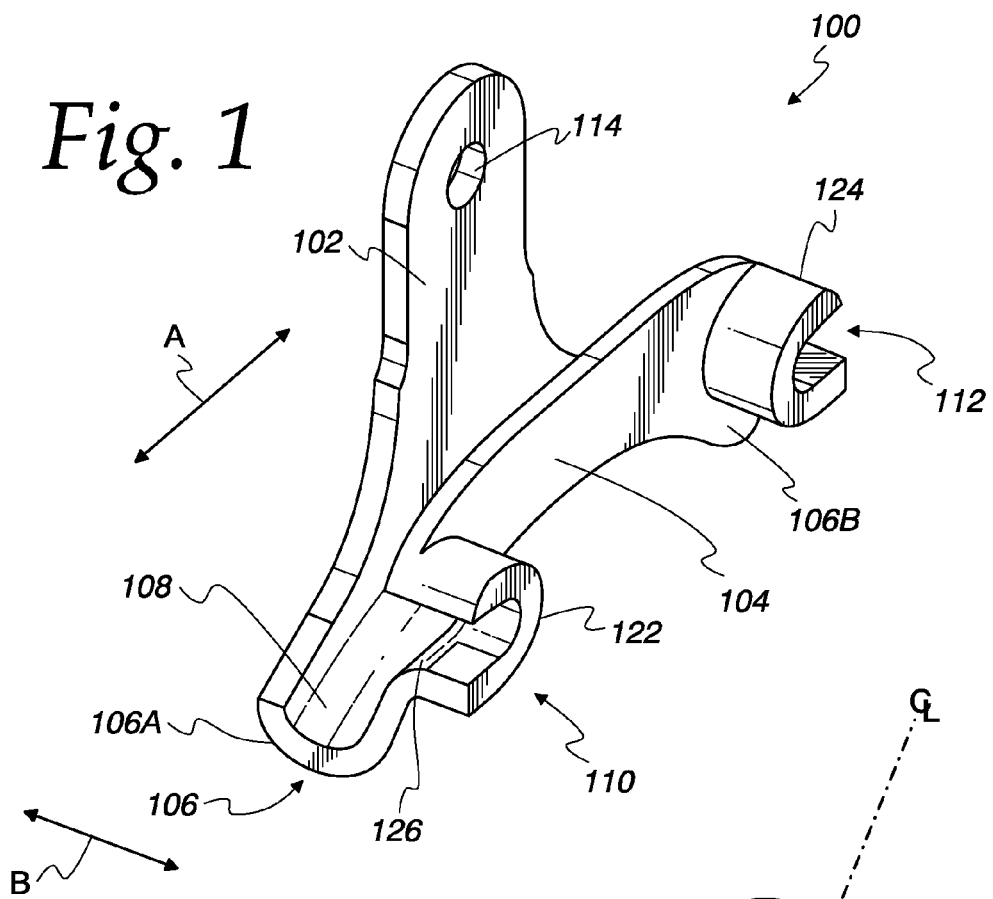
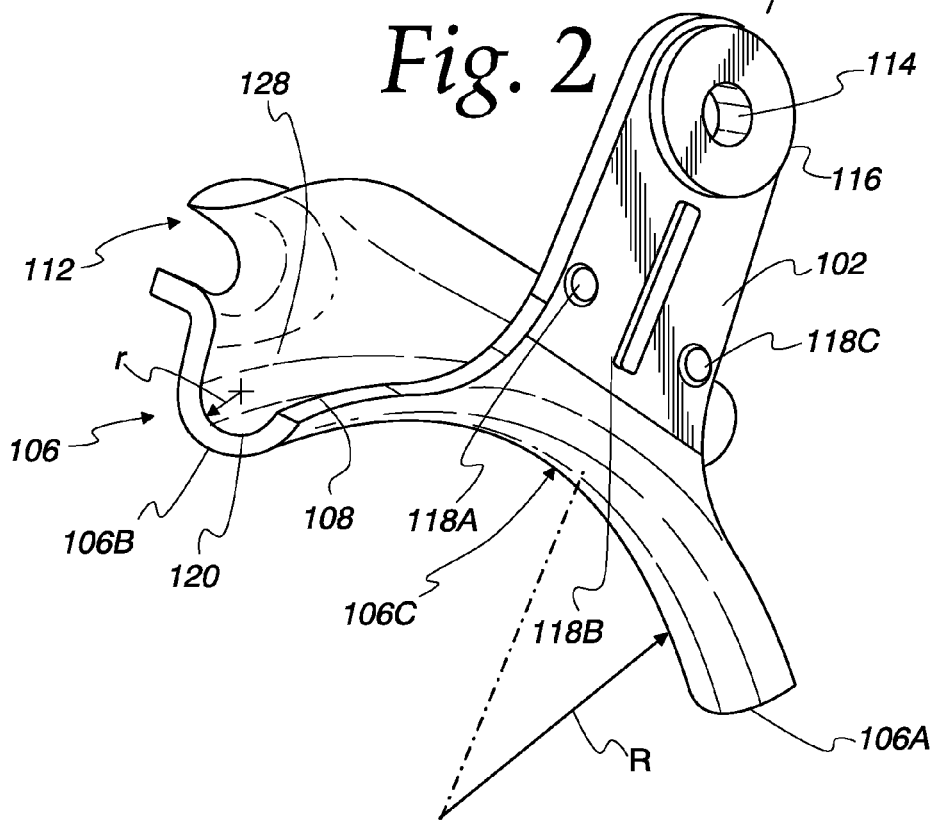

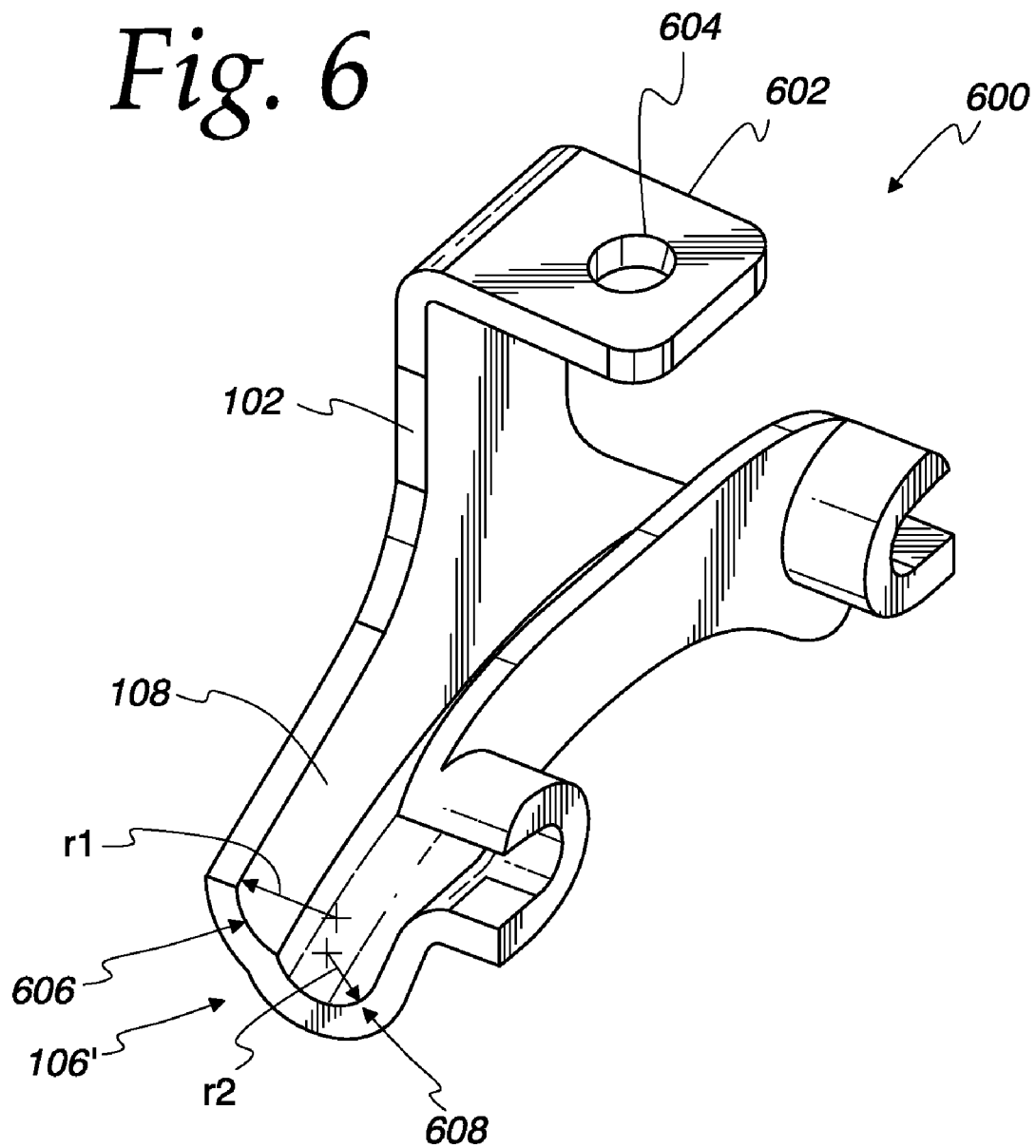

CAPILLARY MOUNTING CLIP

BACKGROUND

Capillary sensors are well known in the art and may be utilized to, for example, provide precise temperature control. Capillary sensors generally include a sensor bulb secured to a first end of a capillary tube and a diaphragm and electric switch secured to a second end of the capillary tube. The capillary tube, in turn, contains fluid that expands or contracts in response to temperature changes detected at the sensor bulb. As the fluid volume changes (i.e., expands or contracts) within the capillary tube in response to temperature changes, the pressure within the capillary tube moves the diaphragm and trips the electric switch. If the capillary sensor is mounted in, for example, a heating, ventilation and air conditioning (HVAC) duct, the change in temperature and the subsequent activation of the electric switch may be used by HVAC air controller to cause an increase or decrease in airflow through the duct. Mounting a capillary sensor within a duct typically requires extending the capillary tube along and across the airflow channeled along the interior of the duct, which requires bending the capillary tube in one or more planes. Improper installation of the capillary tube using conventional capillary tube supports and mounting clips often leads to kinks, bends or other discontinuities in the tube that effect the accuracy of the capillary sensor.

Thus, there is a need for an improved capillary mounting clip that addresses the problems noted above and enables bending of a capillary tube in one or more planes to ensure proper and expedient installation of the tube.

SUMMARY

The disclosure provided herein is directed to a capillary mounting clip configured to support a capillary tube portion of a capillary sensor disposed, for example, within a heating, ventilation and air conditioning (HVAC) duct. Moreover, the disclosed capillary mounting clip includes one or more capillary slots configured to support and provide for a change in direction of the capillary tube while minimizing kinks, bends or other discontinuities in the capillary tube that may affect the accuracy the capillary sensor. In one embodiment, the capillary mounting clip may be a molded capillary mounting clip.

In one embodiment, a capillary mounting clip is disclosed. The capillary mounting clip includes a first planar surface, a second planar surface aligned parallel to the first planar surface, a curvilinear capillary mounting surface carried between the first planar surface and the second planar surface wherein the curvilinear capillary clip mounting surface is sized to smoothly accept a substantially cylindrical outer surface of a capillary tube; and a capillary slot defined within the second planar surface wherein the capillary slot is aligned substantially perpendicular to the first planar surface.

In another embodiment, a capillary mounting clip is disclosed. A capillary mounting clip includes a substantially U-shaped bracket having a back mounting surface having a mounting hole disposed therein. The substantially U-shaped bracket further includes a front mounting surface aligned substantially parallel to the back mounting surface, a capillary mounting channel carried between the back mounting surface and the front mounting surface wherein the capillary mounting channel includes a curvilinear surface, and a capillary slot formed within the front mounting surface, wherein the capillary slot include a transition surface configured to smoothly transition the curvilinear surface to the capillary slot, wherein the capillary mounting channel and the capillary slot are sized to smoothly accept and support a substantially cylindrical outer surface of a capillary tube.

In another embodiment, a capillary mounting clip that includes a substantially U-shaped bracket having a back mounting surface, a front mounting surface aligned substantially parallel to the back mounting surface, and a capillary mounting channel carried between the back mounting surface and the front mounting surface, wherein the capillary mounting channel includes a curvilinear surface is disclosed. The capillary mounting clip includes a capillary slot formed within the front mounting surface, and a transition surface formed between the curvilinear surface of the capillary mounting channel and the capillary, wherein the transition surface is configured to smoothly transition the curvilinear surface to the capillary slot, wherein the capillary mounting channel and the capillary slot are sized to smoothly accept and support a substantially cylindrical outer surface of a capillary tube Other embodiments or features are disclosed, and each of the embodiments or features can be used alone or together in combination. Additional advantages of the disclosed embodiments are described in, and will be apparent from, the following Detailed Description and the figures.

BRIEF DESCRIPTION OF THE FIGURES

FIG. 1 illustrates a top, front perspective view of an exemplary capillary mounting clip constructed in accordance with the teachings of the present invention provided herein;

FIG. 2 illustrates a bottom, rear perspective view of the exemplary capillary mounting clip shown in FIG. 1;

FIG. 6 illustrates an alternate embodiment of a capillary mounting clip consistent with the present invention.

DETAILED DESCRIPTION

Figure 3:
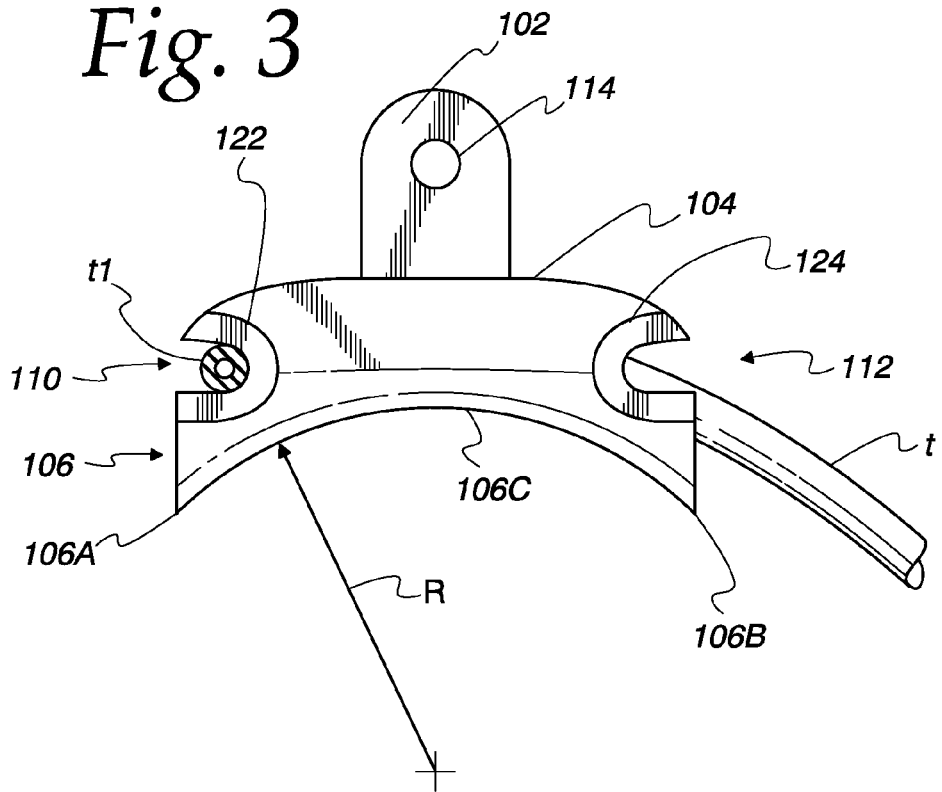
FIG. 3 illustrates a front view of the exemplary capillary mounting clip shown in FIG. 1.

The disclosure provided herein is directed to a capillary mounting clip configured to support a capillary tube portion of a capillary sensor disposed, for example, within a heating, ventilation and air conditioning (HVAC) duct. Moreover, the disclosed capillary mounting clip includes one or more capillary slots configured to support and allow for a change in direction of the capillary tube while minimizing kinks, bends or other discontinuities in the capillary tube that may affect the accuracy the capillary sensor. In one embodiment, the capillary mounting clip may be a molded capillary mounting clip.

FIG. 1 illustrates a top front perspective view of an exemplary capillary mounting clip 100 constructed in accordance with the teachings of the present invention provided herein. The capillary mounting clip 100 includes a first planar surface 102 (or back mounting surface) disposed away from and parallel to a second planar surface 104 (or front mounting surface). The capillary mounting clip 100 further includes a capillary mounting channel 106 defining a curvilinear capillary mounting surface 108. In one implementation, the capillary mounting channel 106 is a substantially U-shaped bracket having the inner curvilinear capillary mounting surface 108. The capillary mounting channel 106 is carried between the first planar surface 102 and the second planar surface. The second planar surface 104 further includes a first capillary slot 110 formed substantially adjacent to a first end 106A of the capillary mounting channel 106. The second planar surface 104 further includes a second capillary slot 112 formed substantially adjacent to a second end 106B of the capillary mounting channel 106.

Figure 5:
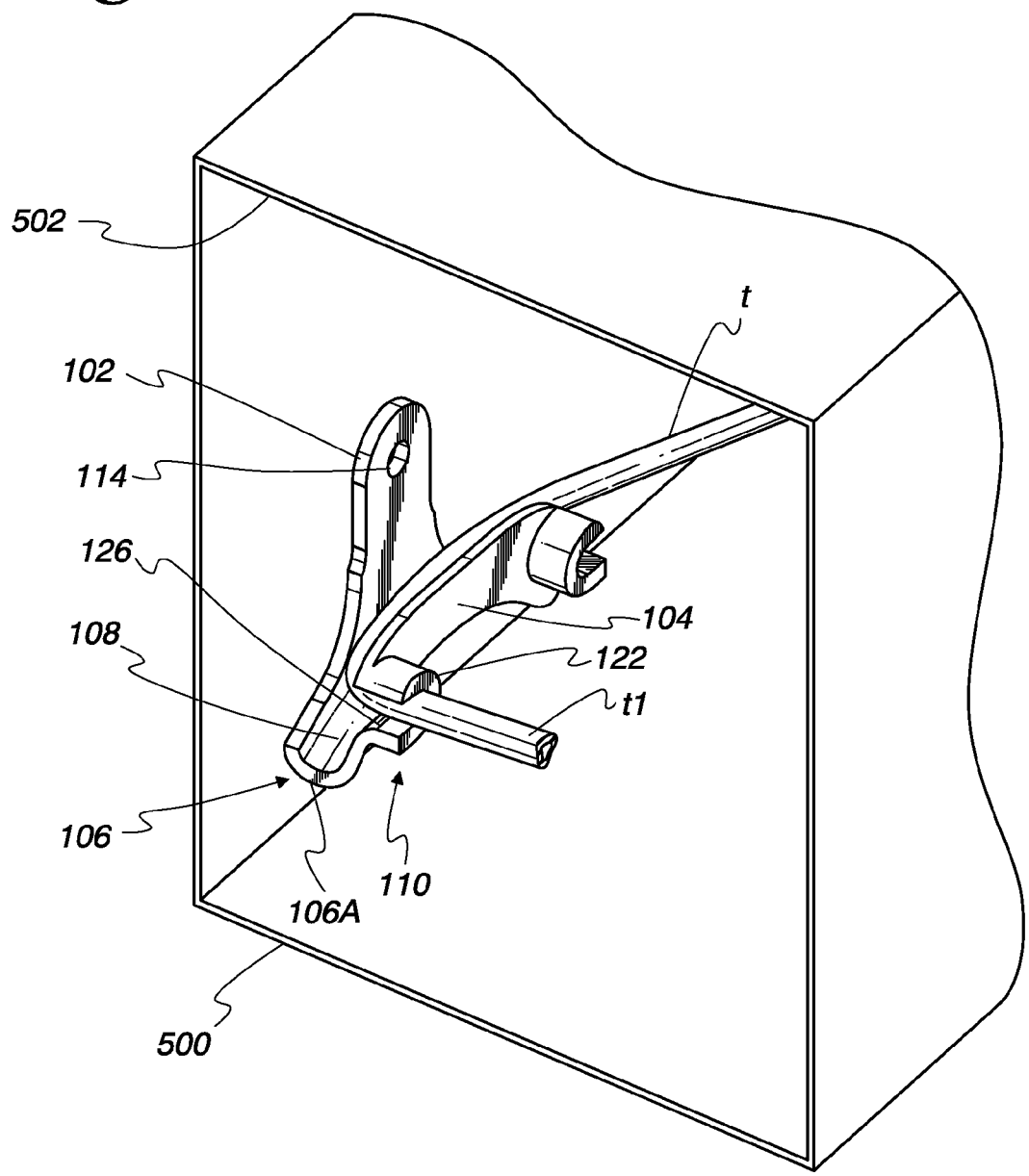
FIG. 5 illustrates the exemplary capillary mounting clip mounted within an exemplary duct.

FIG. 2 illustrates a bottom rear perspective view of the exemplary capillary mounting clip 100. The first planar surface 102 may further include a mounting hole 114. The first planar surface 102 may be configured as a mounting surface and utilize the mounting hole 114 to align and hang the capillary mounting clip 100 on an inner surface of a duct 500 (see FIG. 5). The back or reverse side of the first planar surface or mounting surface 102 may include a raised reinforcing ring 116 encircling and supporting the mounting hole 114. The mounting hole 114 may be sized to accept a manually insertable, one-way hanger that resembles a Christmas tree where the branches collapse on insertion but expand to prevent extraction. The back or reverse side of the first planar surface or mounting surface 102 may further include one or more stand-offs 118A to 118C formed to have a height equal to the height of the raised reinforcing ring 116. The raised reinforcing portion 116 and the stand-offs 118 (individually identified by the reference numerals 118A to 118C) cooperate to support and align the capillary mounting clip 100 adjacent to a surface of the duct 500 while improving the ability of the mounting hole 114 to support a load.

The length of the capillary mounting channel 106 may, in the direction indicated by the arrow A (see FIG. 1), form an arc defined by the first end 106A, second end 106B and a midpoint 106C. The arc may have, for example, a radius R of 150 mm, 1.5 inches or any other distance allowing the smooth travel of a capillary tube thereover. Similarly, a channel portion 120 of the capillary mounting channel 106 and capillary mounting surface 108 may have or define a radius r equal to $3/16$ of an inch. The radius r provides support and a smooth surface for travel of an exemplary capillary tube having a $1/4$ inch or less outer diameter.

The first and second capillary slots 110 and 112 are, in this embodiment, symmetrical about the centerline CL of the clip 100 as shown in FIG. 2. Both of the capillary slots 110 and 112 include extended C-shaped supports 122 and 124. The C-shaped support 122 of the first capillary slot 110 smoothly connects to the first end 106A via a transition surface 126. The C-shaped support 122, in this embodiment, extends substantially perpendicular to and away from the first planar surface or mounting surface 102. Similarly, the C-shaped support 124 of the first capillary slot 112 smoothly connects to the second end 106B via a transition surface 128 and may extend substantially perpendicular to and away from the first planar surface or mounting surface 102. The smooth, curvilinear surfaces of the capillary mounting channel 106, the capillary mounting surface 108 and the C-shaped supports 122 and 124 are configured to support a capillary tube without binding, kinking or otherwise restricting fluid flow therein. The first and second capillary slots 110 and 112 and the C-shaped supports 122 and 124, respectively, allow a capillary tube t (see FIG. 3) extending along the capillary mounting channel 106 in the direction indicated by the arrow A (see FIG. 1) to be bent or otherwise redirected at an angle, such as ninety (90) degrees, to the mounting channel 106 through one or both of the first and second capillary slots 110 and 112 (see FIGS. 3 and 5).

In an alternate embodiment, the first and second slots 110 and 112 may be vertically aligned or oriented to the mounting channel 106 (i.e., perpendicular to a plane defined by the arrows A and B in FIG. 1). Moreover, one of the slots 110 or 112 may be vertically oriented while the other may be horizontally oriented (i.e., parallel to a plane defined by the arrows A and B in FIG. 1). The number and orientation of the slots may be individually tailored or customized depending on the application for which the capillary mounting clip 100 is to be utilized.

FIG. 3 illustrates a front view of the capillary mounting clip 100. The capillary mounting clip 100 supports and directs a capillary tube t. A first end t1 of the capillary tube t is shown supported by the first capillary slot 110. Thus, the capillary mounting clip 100 allows the first end t1 of the capillary tube t to be seamlessly bent ninety (90) degrees (extending in the z-axis out of the plane of the paper) relative to the direction (indicated by the direction of the arrow A in FIG. 1) of the capillary mounting channel 106.

Figure 4:
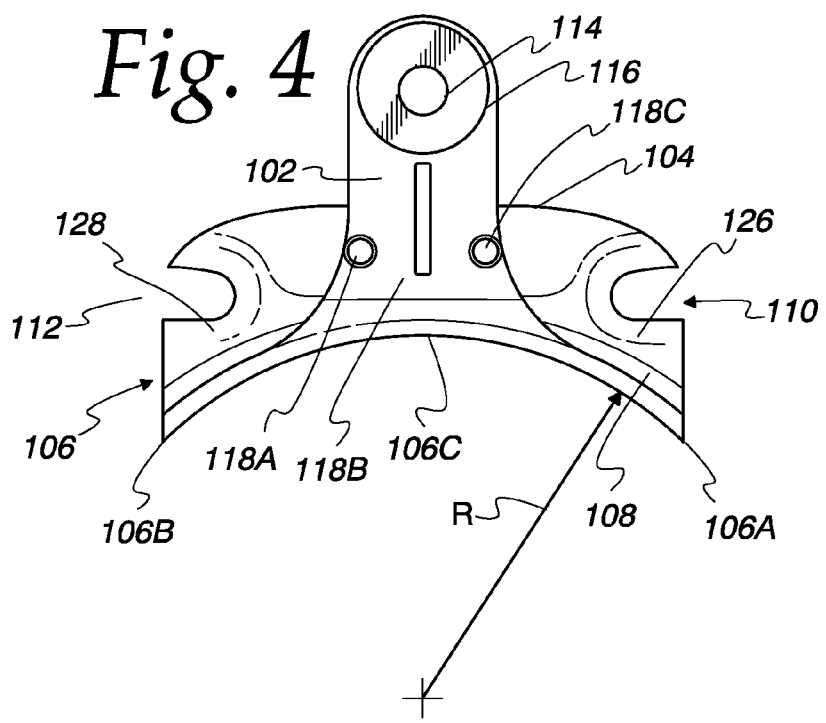
FIG. 4 illustrates a rear view of the exemplary capillary mounting clip shown in FIG. 1.

FIG. 4 illustrates a rear or reverse view of the capillary mounting clip 100. The rear view clearly shows the transition surfaces 126 and 128 smoothly and seamlessly extending between capillary mounting surface 108 and the first and second capillary slots 110 and 112, respectively. The transition surfaces 126 and 128 allow a capillary tube t (see FIG. 4) to be bent without kinking.

FIG. 6 illustrates an alternate embodiment of a capillary mounting clip 600 consistent with the present invention. In this exemplary embodiment, the first planar surface 102 may integrally connect to a third planar surface 602 that extends at an angle perpendicular to the first planar surface 102. The third planar surface 602 forms a top surface having a top mounting hole 604 that allows the capillary clip 600 to be hung from a top surface 502 of the duct 500 (see FIG. 5). The capillary clip 600 may further include a capillary mounting channel 106' that includes a first mounting channel 606 having a radius r1 and a second mounting channel 608 having a radius r2. In this configuration, the radius r1 is greater than the radius r2 allowing both large and small diameter capillary tubes to be supported by the capillary clip 600 and redirected by either of the slots 110 or 112 formed in the clip 600 as described herein for clip 100.

The capillary mounting clip 100 or 600 may, for example, be manufactured in an injection molding process utilizing materials such as Valox 420SE0. The exemplary Valox family of thermoplastic polyester resins are semi-crystalline materials based on polybutylene terephthalate (PBT) and/or polyethylene terephthalate (PET) polymers. Valox resins combine heat and chemical resistance, as well as outstanding electrical properties, good processability and surface appearance. The injection mold itself may, for example, include side action and the part may be sub-gated in any manner known in the art of injection molding.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A capillary mounting clip, comprising:
   a first planar surface;
   a second planar surface aligned parallel to the first planar surface;
   a curvilinear capillary mounting surface carried between the first planar surface and the second planar surface, wherein the curvilinear capillary mounting surface is sized to smoothly accept a substantially cylindrical outer surface of a capillary tube; and a capillary slot defined within the second planar surface, wherein the capillary slot includes a curvilinear capillary mounting surface configured to direct the capillary tube substantially perpendicular to the first planar surface.

2. The capillary mounting clip of claim 1, wherein the capillary slot is formed substantially adjacent to a first end of the curvilinear capillary mounting surface.

3. The capillary mounting clip of claim 1, further comprising:
a second capillary slot defined within the second planar surface, wherein the second capillary slot is configured to direct the capillary tube substantially perpendicular to the first planar surface.

4. The capillary mounting clip of claim 3, wherein the second capillary slot is formed substantially adjacent to a second end of the curvilinear capillary mounting surface.

5. The capillary mounting clip of claim 1, further comprising a mounting hole formed in the first planar surface.

6. The capillary mounting clip of claim 1, wherein the curvilinear capillary mounting surface includes a first mounting channel having a first radius and a second mounting channel having a second radius wherein the first radius is greater than the second radius.

7. The capillary mounting clip of claim 1, further comprising:
a third planar surface attached substantially perpendicularly to the first planar surface, wherein the third planar surface includes a mounting hole disposed therein.

8. A capillary mounting clip, comprising:
a substantially U-shaped bracket, the substantially U-shaped bracket including:
a back mounting surface having a mounting hole disposed therein;
a front mounting surface aligned substantially parallel to the back mounting surface;
a capillary mounting channel carried between the back mounting surface and the front mounting surface, wherein the capillary mounting channel includes a curvilinear surface; and
a capillary slot formed within the front mounting surface, wherein the capillary slot includes a transition surface configured to smoothly transition the curvilinear surface to the capillary slot;
wherein the capillary mounting channel and the capillary slot are sized to smoothly accept and support a substantially cylindrical outer surface of a capillary tube.

9. The capillary mounting clip of claim 8, wherein the capillary slot is formed substantially adjacent to a first end of the curvilinear capillary mounting surface and configured to direct the capillary tube at a first angle to the first planar surface.

10. The capillary mounting clip of claim 8 further comprising:
a second capillary slot defined within the front mounting surface, wherein the capillary slot is configured to direct the capillary tube at a second angle to the first planar surface.

11. The capillary mounting clip of claim 10, wherein the second capillary slot is formed substantially adjacent to a second end of the capillary mounting channel and directs the capillary tube at the second angle such that the capillary tube is substantially perpendicular to the first planar surface.

12. The capillary mounting clip of claim 8, wherein the curvilinear surface includes a first mounting surface having a first radius and a second mounting surface having a second radius wherein the first radius is greater than the second radius.

13. The capillary mounting clip of claim 8 further comprising:
a top surface attached substantially perpendicularly to the back mounting surface, wherein the top surface includes a top mounting hole disposed therein.

14. A capillary mounting clip includes a substantially U-shaped bracket having a back mounting surface, a front mounting surface aligned substantially parallel to the back mounting surface, and a capillary mounting channel carried between the back mounting surface and the front mounting surface, wherein the capillary mounting channel includes a curvilinear surface, the capillary mounting clip comprising:
a capillary slot formed within the front mounting surface; and
a transition surface formed between the curvilinear surface of the capillary mounting channel and the capillary slot, wherein the transition surface is configured to smoothly transition the curvilinear surface to the capillary slot;
wherein the capillary mounting channel and the capillary slot are sized to smoothly accept and support a substantially cylindrical outer surface of a capillary tube.

15. The capillary mounting clip of claim 14 further comprising:
a second capillary slot formed within the front mounting surface, wherein the capillary slot is aligned substantially perpendicular to the front mounting surface.

* * * * *